US009178782B2

(12) United States Patent
Matthews et al.

(10) Patent No.: US 9,178,782 B2
(45) Date of Patent: Nov. 3, 2015

(54) ANNOTATED TRACING DRIVEN NETWORK ADAPTATION (71) Applicant: Broadcom Corporation, Irvine, CA (US)

(72) Inventors: William Brad Matthews, San Jose, CA (US); Puneet Agarwal, Cupertino, CA (US); Bruce Hui Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 204 days.

(21) Appl. No.: 13/847,906

(22) Filed: Mar. 20, 2013

(65) Prior Publication Data

US 2014/0126396 A1    May 8, 2014

Related U.S. Application Data (60) Provisional application No. 61/722,491, filed on Nov. 5, 2012.

(51) Int. Cl.
*H04L 12/26* (2006.01)
*H04L 12/801* (2013.01)
*H04L 12/24* (2006.01)

(52) U.S. Cl.
CPC ............ *H04L 43/045* (2013.01); *H04L 43/065* (2013.01); *H04L 43/10* (2013.01); *H04L 47/10* (2013.01); *H04L 41/12* (2013.01); *H04L 41/22* (2013.01); *H04L 43/067* (2013.01); *H04L 43/0817* (2013.01); *H04L 43/106* (2013.01)

(58) Field of Classification Search
CPC .................................................. H04L 43/045
See application file for complete search history.

(56) References Cited

U.S. PATENT DOCUMENTS

| 6,333,917 | B1 | 12/2001 | Lyon et al. | |
|---|---|---|---|---|
| 8,046,720 | B2 | 10/2011 | Wirth | |
| 2004/0261016 | A1* | 12/2004 | Glass et al. | 715/512 |
| 2007/0147250 | A1 | 6/2007 | Druke et al. | |
| 2009/0168648 | A1* | 7/2009 | Labovitz et al. | 370/229 |
| 2010/0287236 | A1* | 11/2010 | Amento et al. | 709/204 |
| 2011/0032935 | A1 | 2/2011 | Yang | |
| 2011/0058477 | A1 | 3/2011 | Kwan et al. | |
| 2011/0103238 | A1* | 5/2011 | Monk et al. | 370/252 |
| 2011/0216756 | A1 | 9/2011 | Ai et al. | |
| 2011/0285516 | A1 | 11/2011 | Ritter | |

(Continued)

OTHER PUBLICATIONS

Sigelman, Benjamin H., et al., Dapper, A Large-Scale Distributed Systems Tracing Infrastructure, Google Technical Report dapper-2010-1, Apr. 2010.

(Continued)

*Primary Examiner* — Brian D Nguyen
*Assistant Examiner* — Toan Nguyen
(74) *Attorney, Agent, or Firm* — Brinks Gilson & Lione (57) ABSTRACT

Network devices add annotation information to network packets as they travel through the network devices. The network devices may be switches, routers, bridges, hubs, or any other network device. The annotation information may be information specific to the network devices, as opposed to simply the kinds of information available at application servers that receive the network packets. As just a few examples, the annotation information may include switch buffer levels, routing delay, routing parameters affecting the packet, switch identifiers, power consumption, and heat, moisture, or other environmental data.

20 Claims, 11 Drawing Sheets

(56) References Cited

U.S. PATENT DOCUMENTS

| | | |
|---|---|---|
| 2012/0039169 A1 | 2/2012 | Susitaival et al. |
| 2012/0166637 A1 | 6/2012 | White, Jr. et al. |
| 2012/0233150 A1 * | 9/2012 | Naim et al. ............... 707/722 |
| 2012/0327954 A1 | 12/2012 | Iourtchenko et al. |

OTHER PUBLICATIONS

U.S. App. No. 13/834,462, Office Action dated Sep. 29, 2014, 27 pages.

U.S. App. No. 13/834,462, Office Action dated Jan. 22, 2015, 31 pages.

* cited by examiner

ANNOTATED TRACING DRIVEN NETWORK ADAPTATION

PRIORITY CLAIM

This application claims priority to U.S. Provisional Application Ser. No. 61/722,491 filed Nov. 5, 2012, titled Annotated Tracing Driven Network Adaptation which is incorporated herein by reference in its entirety.

TECHNICAL FIELD

This disclosure relates to networking. This disclosure also relates to adding annotation information to network packets as they travel through network devices such as switches.

BACKGROUND

High speed data networks form part of the backbone of what has become indispensable worldwide data connectivity. Within the data networks, network devices such as switching devices direct data packets from source ports to destination ports, helping to eventually guide the data packets to their correct recipient. Improvements in network devices will help improve high speed data networks.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Example Architecture

Figure 1:
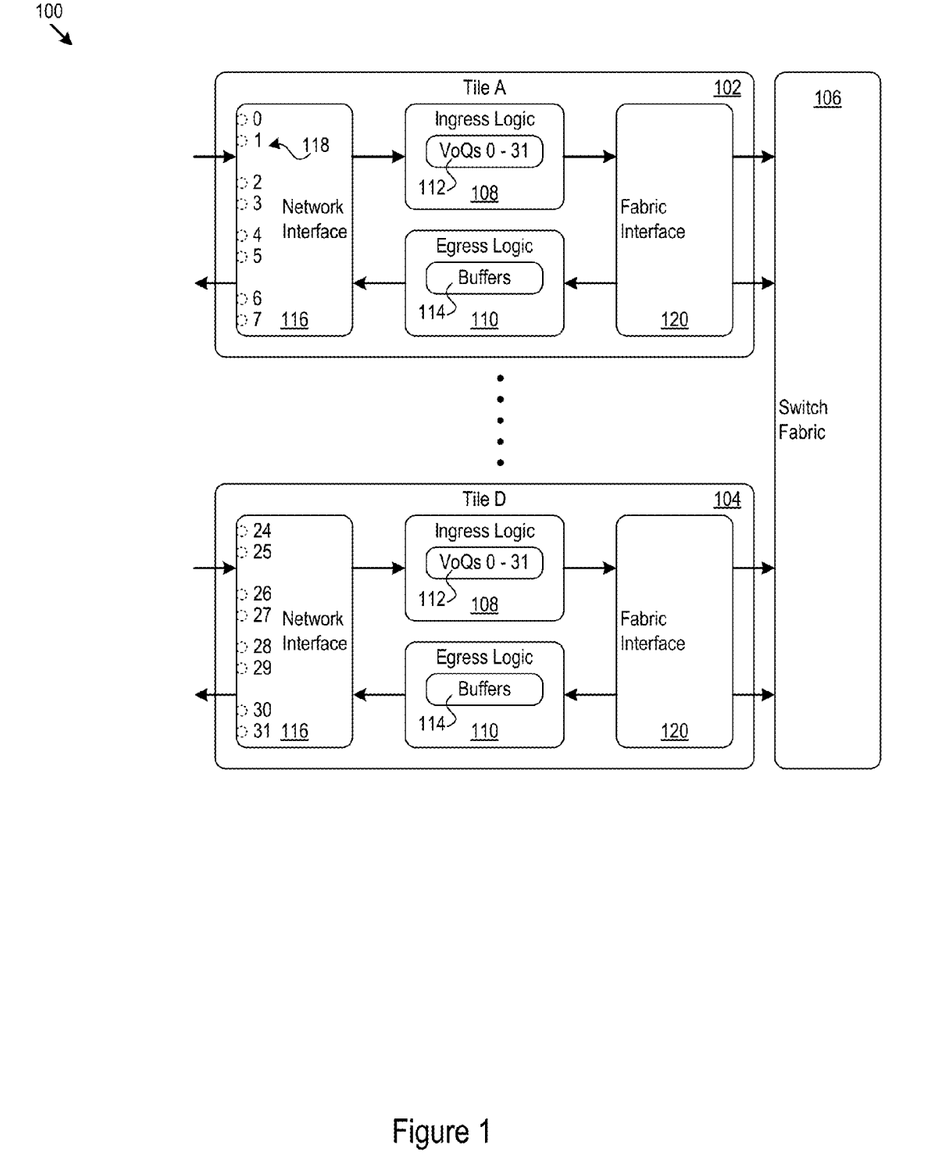
FIG. 1 shows an example of a switch architecture that may include annotation functionality.

FIG. 1 shows an example of a switch architecture 100 that may include packet annotation functionality. The description below provides a backdrop and a context for the explanation of packet annotation, which follows the example architecture description. Furthermore, the description below provides examples of detailed device functionality that may be monitored by adding annotation information into packets. Accordingly, the example architecture 100 is presented as just one of many possible network device architectures that may include packet annotation functionality, and the example provided in FIG. 1 is one of many different possible alternatives. The techniques described further below are not limited to any specific device architecture.

The architecture includes several tiles, e.g., the tiles specifically labeled as tile A 102 and the tile D 104. In this example, each tile has processing logic for handling packet ingress and processing logic for handling packet egress. A switch fabric 106 connects the tiles. Packets, sent for example by source network devices such as application servers, arrive at the network interfaces 116. The network interfaces 116 may include any number of physical ports 118. The ingress logic 108 buffers the packets in memory buffers. Under control of the switch architecture 100, the packets flow from an ingress tile, through the fabric interface 120 through the switching fabric 106, to an egress tile, and into egress buffers in the receiving tile. The egress logic sends the packets out of specific ports toward their ultimate destination network device, such as a destination application server.

Each ingress tile and egress tile may be implemented as a unit (e.g., on a single die or system on a chip), as opposed to physically separate units. Each tile may handle multiple ports, any of which may be configured to be input only, output only, or bi-directional. Thus, each tile may be locally responsible for the reception, queueing, processing, and transmission of packets received and sent over the ports associated with that tile.

As an example, in FIG. 1 the tile A 102 includes 8 ports labeled 0 through 7, and the tile D 104 includes 8 ports labeled 24 through 31. Each port may provide a physical interface to other networks or network devices, such as through a physical network cable (e.g., an Ethernet cable). Furthermore, each port may have its own line rate (i.e., the rate at which packets and received and sent on the physical interface). For example, the line rates may be 10 Mbps, 100 Mbps, 1 Gbps, or any other line rate.

The techniques described below are not limited to any particular configuration of line rate, number of ports, or number of tiles, nor to any particular network device architecture. Instead, the annotation techniques described below are applicable to any network device that incorporates the annotation logic described below. The network devices may be switches, routers, hubs, or any other network device that handle routing packets from sources to destinations through a network. The network devices are part of one or more networks that connect, for example, application servers together across the networks.

The tiles include packet processing logic, which may include ingress logic 108, egress logic 110, annotation logic, and any other logic in support of the functions of the network device. The ingress logic 108 processes incoming packets, including buffering the incoming packets by storing the packets in memory. The ingress logic 108 may define, for example, virtual output queues 112 (VoQs), by which the ingress logic 108 maintains one or more queues linking packets in memory for the egress ports. The ingress logic 108 maps incoming packets from input ports to output ports, and determines the VoQ to be used for linking the incoming packet in memory. The mapping may include, as examples, analyzing addressee information in the packet headers, and performing a lookup in a mapping table that matches addressee information to output port(s).

The egress logic 110 may maintain one or more output buffers 114 for one or more of the ports in its tile. The egress logic 110 in any tile may monitor the output buffers 114 for congestion. When the egress logic 110 senses congestion (e.g., when any particular output buffer for any particular port is within a threshold of reaching capacity), the egress logic 110 may throttle back its rate of granting bandwidth credit to the ingress logic 108 in any tile for bandwidth of the congested output port. The ingress logic 108 responds by reducing the rate at which packets are sent to the egress logic 110, and therefore to the output ports associated with the congested output buffers.

The ingress logic 108 receives packets arriving at the tiles through the network interface 116. In the ingress logic 108, a packet processor may perform link-layer processing, tunnel termination, forwarding, filtering, and other packet processing functions on the received packets. The packets may then flow to an ingress traffic manager (ITM). The ITM writes the packet data to a buffer, from which the ITM may decide whether to accept or reject the packet. The ITM associates accepted packets to a specific VoQ, e.g., for a particular output port. The ingress logic 108 may manage one or more VoQs that are linked to or associated with any particular output port. Each VoQ may hold packets of any particular characteristic, such as output port, class of service (COS), prioirity, packet type, or other characteristic.

The ITM, upon linking the packet to a VoQ, generates an enqueue report. The annotation logic, described below, may receive the enqueue report as a signal that a new packet has arrived for potential annotation. The ITM may also send the enqueue report to an ingress packet scheduler. The enqueue report may include the VoQ number, queue size, and other information. The ITM may further determine whether a received packet should be placed on a cut-through path or on a store and forward path. If the receive packet should be on a cut-through path, then the ITM may send the packet directly to an output port with as low latency as possible as unscheduled traffic, and without waiting for or checking for any available bandwidth credit for the output port. The ITM may also perform packet dequeueing functions, such as retrieving packets from memory, forwarding the packets to the destination egress tiles, and issuing dequeue reports. The ITM may also perform buffer management, such as admission control, maintaining queue and device statistics, triggering flow control, and other management functions.

In the egress logic 110, packets arrive via the fabric interface 120. A packet processor may write the received packets into an egress buffer 114 (e.g., a queue for an output port through which the packet will exit) in the egress traffic manager (ETM). Packets are scheduled for transmission and pass through an egress transmit packet processor (ETPP) and ultimately out of the output ports.

The ETM may perform, as examples: egress packet reassembly, through which incoming cells that arrive interleaved from multiple source tiles are reassembled according to source tile contexts that are maintained for reassembly purposes; egress multicast replication, through which the egress tile supports packet replication to physical and logical ports at the egress tile; and buffer management, through which, prior to enqueueing the packet, admission control tests are performed based on resource utilization (i.e., buffer and packet descriptors). The ETM may also perform packet enqueue/dequeue, by processing enqueue requests coming from the ERPP to store incoming frames into per egress port class of service (CoS) queues prior to transmission (there may be any number of such CoS queues, such as 2, 4, or 8) per output port.

The ETM may also include an egress packet scheduler to determine packet dequeue events, resulting in packets flowing from the ETM to the ETPP. The ETM may also perform egress packet scheduling by arbitrating across the outgoing ports and COS queues handled by the tile, to select packets for transmission; flow control of egress credit scheduler (ECS), by which, based on total egress tile, per egress port, and per egress port and queue buffer utilization, flow control is sent to the ECS to adjust the rate of transmission of credit grants (e.g., by implementing an ON/OFF type of control over credit grants); flow control of tile fabric data receive, through which, based on total ETM buffer utilization, link level flow control is sent to the fabric interface 120 to cease sending any traffic to the ETM.

Packet Annotation

Figure 2:
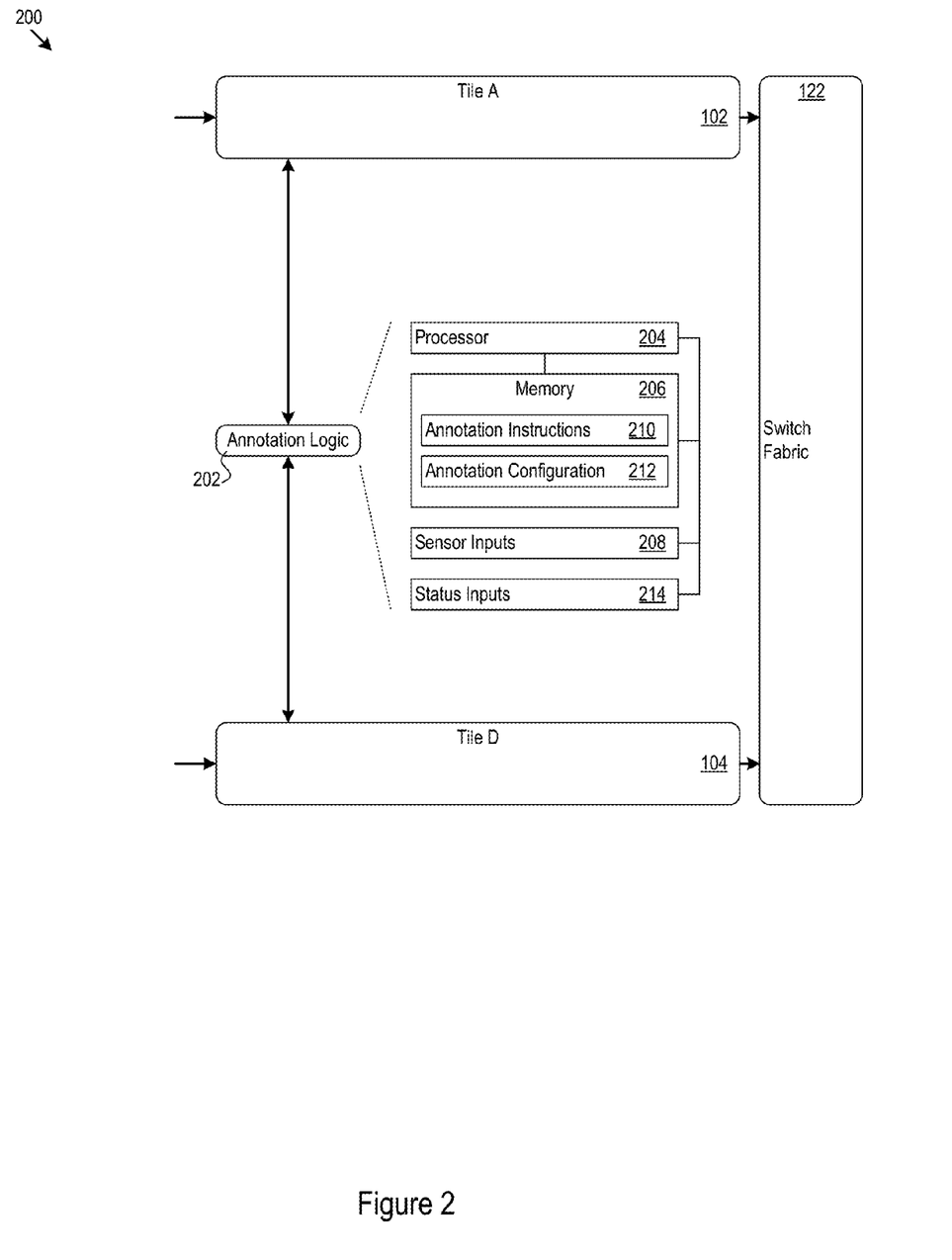
FIG. 2 is an example switch architecture extended to include annotation logic.

FIG. 2 shows an example architecture 200 which is extended to include the annotation logic 202. The annotation logic 202 may be implemented in any combination of hardware, firmware, and software. The annotation logic 202 may be implemented at any one or more points in the architecture 100. As examples, the annotation logic 202 may be a separate controller, may be incorporated into the ingress logic 108, egress logic 110, fabric interfaces 120, network interfaces 116, or fabric transport 106.

In the example of FIG. 2, the annotation logic 202 includes a processor 204, a memory 206, sensor inputs 208, and status inputs 214. The annotation logic 202 will add annotation information into packets passing through the network device. Alternatively or additionally, the annotation logic 202 may create annotation packets, insert annotation information into the annotation packets, and add, at any point in the architecture, the annotation packets into the packet stream passing through the network device.

In some implementations, the processor 204 executes the annotation instructions 210 to perform annotation on packets in existing traffic flows, or to create new packets, annotate them, and insert them into an existing traffic flow. The annotation information may be information obtained from the sensor inputs 208, status inputs 214, or any other information available to the annotation logic 202.

The annotation configuration information 212 may guide the annotation instructions 210. For example, the annotation configuration information 212 may specify when, how frequently or on what schedule, and under what conditions or in response to which events to annotate packets. As additional examples, the annotation configuration information 212 may also specify what information to include or exclude as annotation information, and when to do so, how to annotate (e.g., where to place the annotation information in the packet), or any other annotation operational parameters.

The sensor inputs 208 may provide, for example, environmental information to the annotation logic 202. As examples, the sensor inputs 208 may be temperature, voltage, current, power consumption, vibration, shock, moisture, humidity, fan speed, or other sensor inputs. The network device may add as annotation information any of the information received at the sensor inputs 208. The sensors may report information for the network device as a whole (e.g., 20 Watts of power consumption total), or for any one part or multiple parts of the network device at any desired granularity. Several examples include: power consumption for tile A (e.g., 2 W), power consumption for tile B (e.g., 3.5 W), Fan speed (e.g., Fan 1 speed=1500 RPM, Fan speed 2=4000 RPM), Tile C ingress logic current draw (e.g., 400 ma), or any other sensed data.

The status inputs 214 may provide, for example, status information about the operation of the network device. As examples, the status inputs may provide a device identifier for the network device, or may convey queue fill levels (or other ingress buffer levels) or sizes, and egress buffer levels or sizes. As additional examples, the status inputs may convey network device loading data, packet arrival times at the network device, packet departure times from the network device, the number of packets received at one or more input ports or transmitted our of one or more output ports over any specified time period, and switching delay times (or other measures of latency) for any particular packet, e.g., as an average over all packets or a specified subset of packets. Yet another example is the amount of traffic flow on members of an aggregation group of links, and, as just one example, link imbalance beyond an imbalance threshold may trigger annotation of packets with the traffic flow data for analysis by a downstream analysis system. Any network device may also implement a 'user defined' data field in the annotation information for reporting data selected, defined, or otherwise specified to the network device.

An additional example of annotation is adding annotation information at each hop of a packet through a network. The hop may be, for example, entry of a packet into a network device and exit of the packet from the network device. The annotation information may include, as further examples, network device identifiers, number of hops traversed so far, the hash value of the packet header, payload, or both, routing/path selection criteria or decision variables, and network device configuration settings.

Described another way, any network device may add annotation information in an in-band manner or in an out-of-band manner. With in-band annotation, the network device may add annotation information to packet flow for, e.g., specific applications, on the fly. Doing so may provide real-time or near real-time annotation information as the application executes on the source or destination application servers, and as the application sends and receives packets through the network. With out-of-band annotation, any network device may add annotation information that is not real time or near real time (e.g., on a specific periodic schedule). Accordingly, the out-of-band annotation information may not be as frequent as annotating within an application flow, but may consume less overhead. Either type of annotation may include adding annotation information to packets that begin or end the traffic flow for an application. Furthermore, the beginning and ending packets may be flagged as tracer packets that the network device is operable to recognize and select for adding annotation information.

Note, however, that in-band vs out-of-band annotation is not necessarily a distinction between real time and background operation. In some deployments, that may be one tradeoff that is made. In some implementations, both in-band annotation and out-of-band annotation may have the same degree of accuracy (e.g., both may happen in real-time, or not). However, one consideration with in-band annotation is that annotations will consume bandwidth that is generally allocated for data transfers (including payload data) and not for annotation data. On the other hand, out-of-band annotation based frameworks would not consume bandwidth dedicated for data transfers, but there may be less bandwidth available for out-of-band message transfers. In other words, there are different tradeoffs that a system can make between in-band and out-of-band annotation, and the techniques described in this document are not limited to either one.

In many instances, the annotation information is network device information that is otherwise unknown or unavailable to, as examples, the source application server and to the destination application server. In other words, the annotation information provides a unique view into the status and operation of the network device itself. Examples of such annotation information include ingress or egress buffer fill levels, switch power consumption, and hop delay through the switch. Other examples include routing information, path selection information, loading and oversubscription metrics. Further examples include observed metrics such as average packet size, maximum transmit unit observed, and buffer consumption for any of the device resources. Note also that any annotation may include a time stamp (optionally provided at each hop). The time stamp may indicate when the state information added as annotation information was measured. The time stamp thereby facilitates analysis of and correlation of events across multiple devices. The network device may locally generate the time stamp, or may create the time stamp based on a synchronized clock from a timesync protocol, such as the IEEE1588 precision time protocol.

As a result, the annotation information provides a new level of insight into the network operation. As will be described in detail below, the annotation information may drive informative dashboards displayed, e.g., at an analysis system. The analysis system may then push adaptations back to the network devices upon analysis of the annotation information.

Packets typically include a header and a payload. Either section of the packet may hold annotation information. The annotation logic 202 adds the annotation information in data fields in the packet at any point in the processing of the packet in the network device. As example, the network device may add annotation information to a packet when the packet is in the ingress buffers 108, in the egress buffers 110, at the fabric interface 120, in the switching fabric 106, or at the network interface 118. Accordingly, the packet destination, e.g., an application server, may benefit from the deep insight into the network provided by the annotation information.

Figure 3:
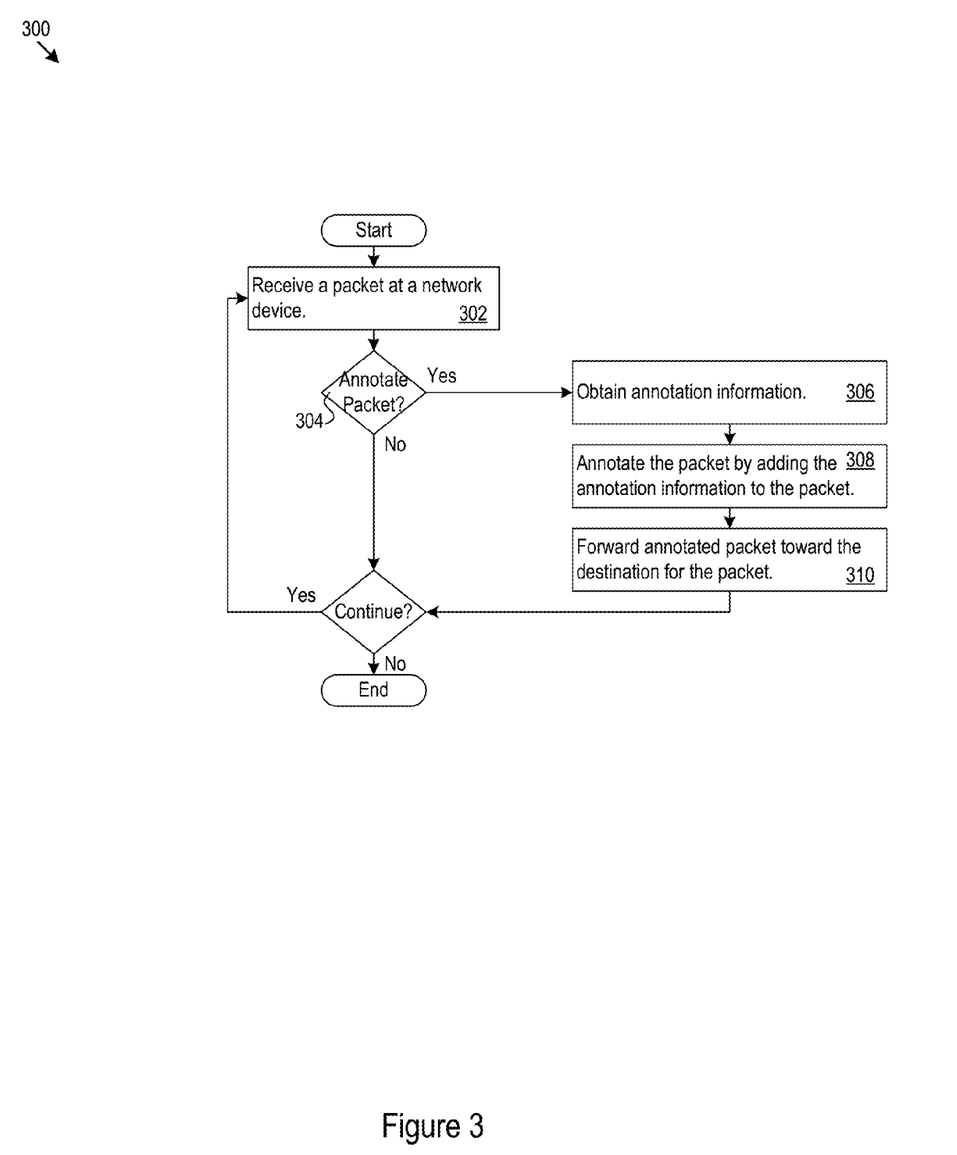
FIG. 3 shows an example of logic for annotating packets.

FIG. 3 shows an example of logic 300 that the annotation logic 202 may implement. The logic 300 receives a packet at a network device (302) in a network that connects a source and a destination through the network device. The logic 300 may then determine whether to select the packet for annotation (304). When the logic 300 selects the packet for annotation, the logic 300 obtains annotation information from the network device (306). The logic 300 annotates the packet by adding the annotation information to the packet (308). The network device then forwards the annotated packet toward the destination (e.g., an application server) for the packet (310).

The network device may continue this process for as long as desired. In some implementations, for example, the network device may receive management commands to start, pause, or halt packet annotation. The management commands may be received from and sent by a local or remote analysis system, for example.

Figure 4:
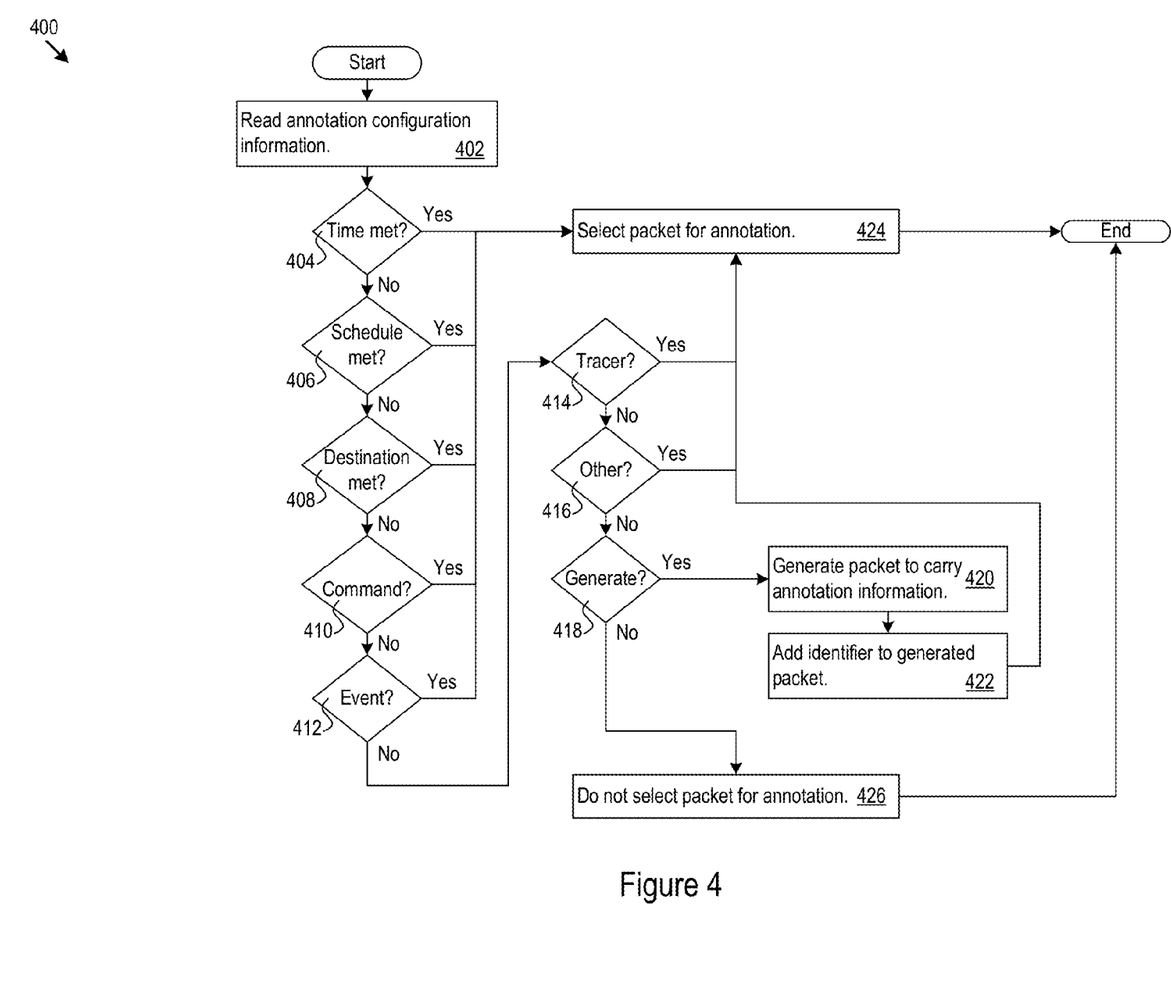
FIG. 4 shows an example of logic for deciding when to annotate packets.

FIG. 4 shows some examples of how the logic 300 may decide when to select a packet for annotation. The logic 400 of FIG. 4 reads annotation configuration information 212 (402), described above. As one example, the logic 400 may determine whether the specific packet meets a particular time criteria (404). The time criteria may be, for instance, that every packet in the network device as of a specific time will be annotated. As another example, the logic 400 may determine whether the packet meets an annotation schedule (406). For instance, the annotation schedule may specify that every 2nd, 3rd, 10th, or nth received packet will be annotated, or that annotation information will be added every nth unit of time, e.g., ever 1 msec, 10 msec, 5 s, or 10 minutes. The annotation schedule may establish periodic or aperiodic (e.g., random) annotation.

The network device may annotate packets based on destination or source (408). Thus, for example, the network device may annotate all packets bound for a specified destination, or arriving from a particular source. Alternatively, the network device may annotate packets at certain times or on certain annotation schedules that are bound for a particular destination. As yet another example, the network device may annotation packets whenever a management command received at the network device instructs the network device to do so (410).

Annotation criteria may be event based (412). As an example of event driven annotation, the network device may annotate packets when specified input or output buffers exceed specified buffer annotation thresholds. As another example, the network device may annotate packets when power consumption as a whole at by any element in the network device (e.g., tile A) exceeds a power annotation threshold. The annotation thresholds and other annotation criteria may be specified in the annotation configuration parameters 212, for example.

In some cases, source application servers may send special tracer packets through the network (414). Under this annotation criterion, when the network device recognizes a tracer packet, the network device may add annotation information before forwarding the annotated packet to the next hop. There are many ways to recognize a tracer packet, such as by locating a particular data pattern or tracer identifier (e.g., in the packet header or payload) in the packets that travel through the network device. Any other annotation criteria may be specified (416), including random packet annotation.

Furthermore, the network device may decide at any time to generate a packet to carry annotation information (418). In other words, rather than adding annotation information into an existing packet, the network device may generate a new packet altogether (420), in which the network device inserts annotation information, and which the network device adds into the traffic flow to any particular destination. The network device may also add identification information into the generated packet to identify it to the destination as a packet that includes annotation information (422). The identification information may be a bit pattern present in the packet header or payload that provides an identifier of an annotated packet.

A generated packet may be considered selected for annotation by virtue of it having been generated for that purpose. Regardless, the network device selects for annotation those packets meeting any established selection criterion (424). Those packets not meeting any selection criterion are not selected for annotation (426).

Figure 5:
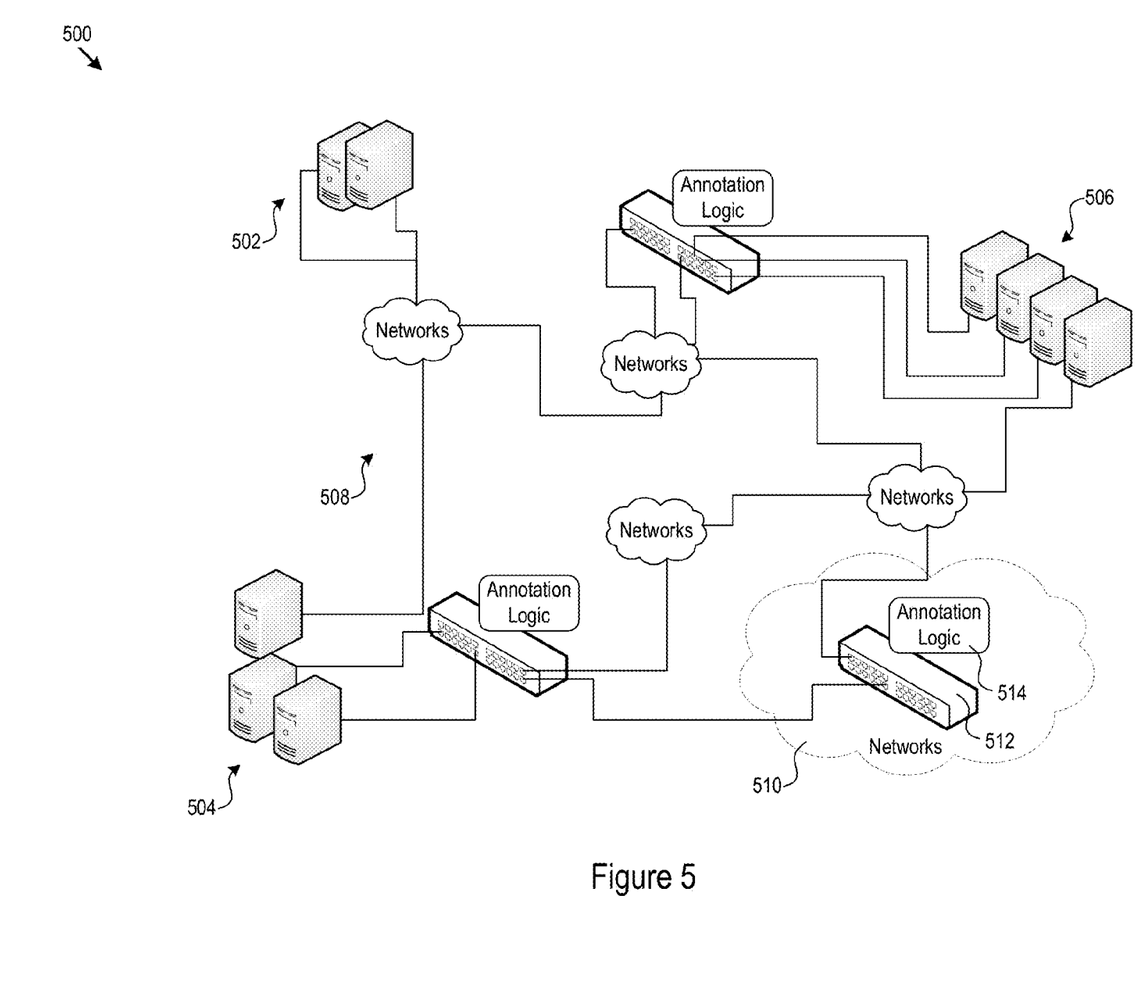
FIG. 5 shows an example communication system in which networked devices communicate with one another.

FIG. 5 shows an example communication system 500 in which networked devices communicate with one another. In the example of FIG. 5, source application servers (e.g., the application servers 502 and 504) communicate with destination application servers (e.g., the destination application servers 506) through an interconnection of networks 508.

As an example, a specific network 510 is labeled among the interconnection of networks 508. The network 510 includes network devices, such as switches, routers, and hubs. The switch 512 is an example of one of the network devices. The switch 512 includes annotation logic 514, which may be implemented, for example, as shown in FIG. 2. Furthermore, annotation logic may be present in any network device located anywhere within the networks 508. Accordingly, as packets travel through any network device that includes annotation logic, the network devices may selectively add annotation information to the packets, e.g., as described above.

Figure 6:
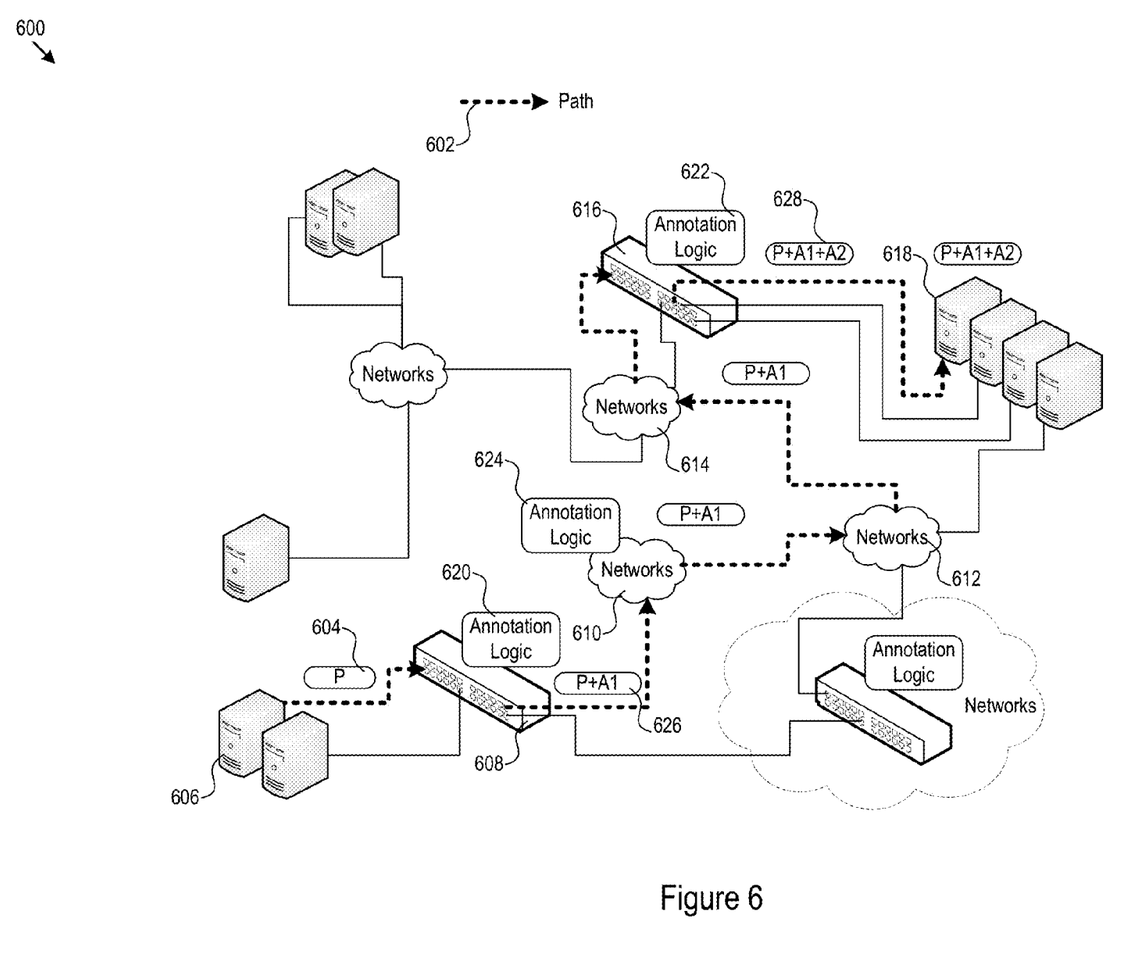
FIG. 6 shows an example communication system in which networked devices communicate with one another.

FIG. 6 continues the example of FIG. 5 and also shows an example communication system 600 in which networked devices communicate with one another. FIG. 6 shows a path 602 through the network taken by a packet 604. The path 602 starts at the application server 606, progresses through the switch 608 and the intermediate networks 610, 612, and 614. The path 602 continues through the switch 616 and terminates at the application server 618.

At various points along the path, annotation logic is present. For example, the switch 608 includes annotation logic 620 and the switch 616 includes annotation logic 622. The networks 610 may also include annotation logic 624, which may be present inside of any switch, router, or other network device in the networks 610.

As shown in FIG. 6, the packet 604 begins without annotation. However, when the packet 604 passes through the switch 608, the annotation logic 620 adds annotation information, A1. As a result, the annotated packet 626 exits from the switch 608, bearing the annotation information A1. The annotated packet 626 travels through the networks 610, 612, and 614. However, in this example, no additional annotation information was added to the annotated packet 626 by the networks 610, 612, and 614. At the switch 616, however, the annotation logic 622 also selects the annotated packet 626 for annotation. Accordingly, the annotation logic 622 adds annotation information A2 to the already annotated packet 626. The annotated packet 628 bearing both the annotation information A1 and A2 arrives at the application server 618. The application server 618 may then analyze the annotation information A1 and A2 to gain insight into the operation of the communication system 600.

Figure 7:
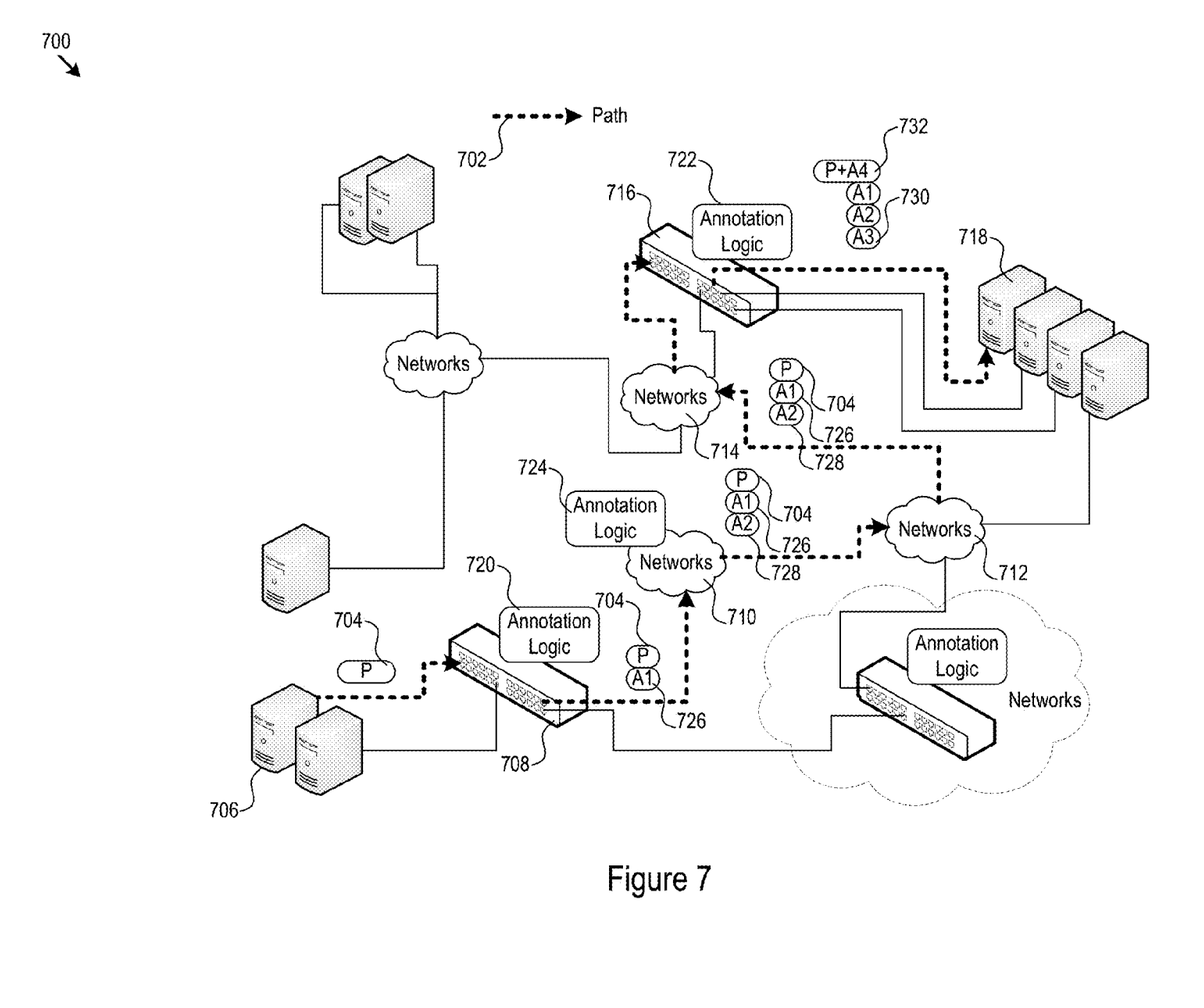
FIG. 7 shows an example communication system in which networked devices communicate with one another.

FIG. 7 shows a different example of a communication system 700 in which networked devices communicate with one another. FIG. 7 shows a path 702 through the network taken by a packet 704. The path 702 starts at the application server 706, progresses through the switch 708, and the intermediate networks 710, 712, and 714. The path 702 continues through the switch 716 and terminates at the application server 718.

At various points along the path, annotation logic is present. For example, the switch 708 includes annotation logic 720 and the switch 716 includes annotation logic 722. The networks 710 also include annotation logic 724, which may be present inside of any switch, router, or other network device in the networks 710.

In FIG. 7, the annotation logic 720 does not annotate the packet 704. However, the annotation logic 720 does generate a new packet to carry annotation information, A1. The annotated generated packet 726, and the unannotated packet 704 travel through the communication system 700, and eventually reach the networks 710. While the various packets are shown traveling the same route in this example to reach a common destination, any packets may travel any particular route to reach the same or different destinations.

Within the networks 710, the annotation logic 724 generates another packet to carry additional annotation information A2. The second generated annotated packet 728 travels through the network switch 716, along with the unannotated packet 704, and the first generated annotated packet 726. The annotation logic 722 in the switch 716 not only generates a new packet to carry yet additional annotation information, A3, but also adds annotation information, A4, into the previously unannotated packet 704. The third generated annotated packet 730, as well as the annotated packet 732 (an annotated version of the original packet 704), arise from the operation of the annotation logic 722.

As a result, the application server 718 receives annotation information in multiple different ways. In particular, the application server 718 receives the annotation information A1, A2, and A3 in the generated annotated packets 726, 728, and 730. The application server 718 also receives the annotation information A4 from within the annotated packet 732, which began as the unannotated packet 704.

Annotation Information Analysis and Network Adaptation

The annotation information may be used to drive network adaptation. In particular, the annotation information provides deeper insight into the operation of the network, often including information that is simply not otherwise available to the application servers, or other higher level entities. As a result, for example, any system that receives the annotation information, including application servers, may receive, analyze, and send adaptation information to guide the operation of the network devices and the network as a whole.

Figure 8:
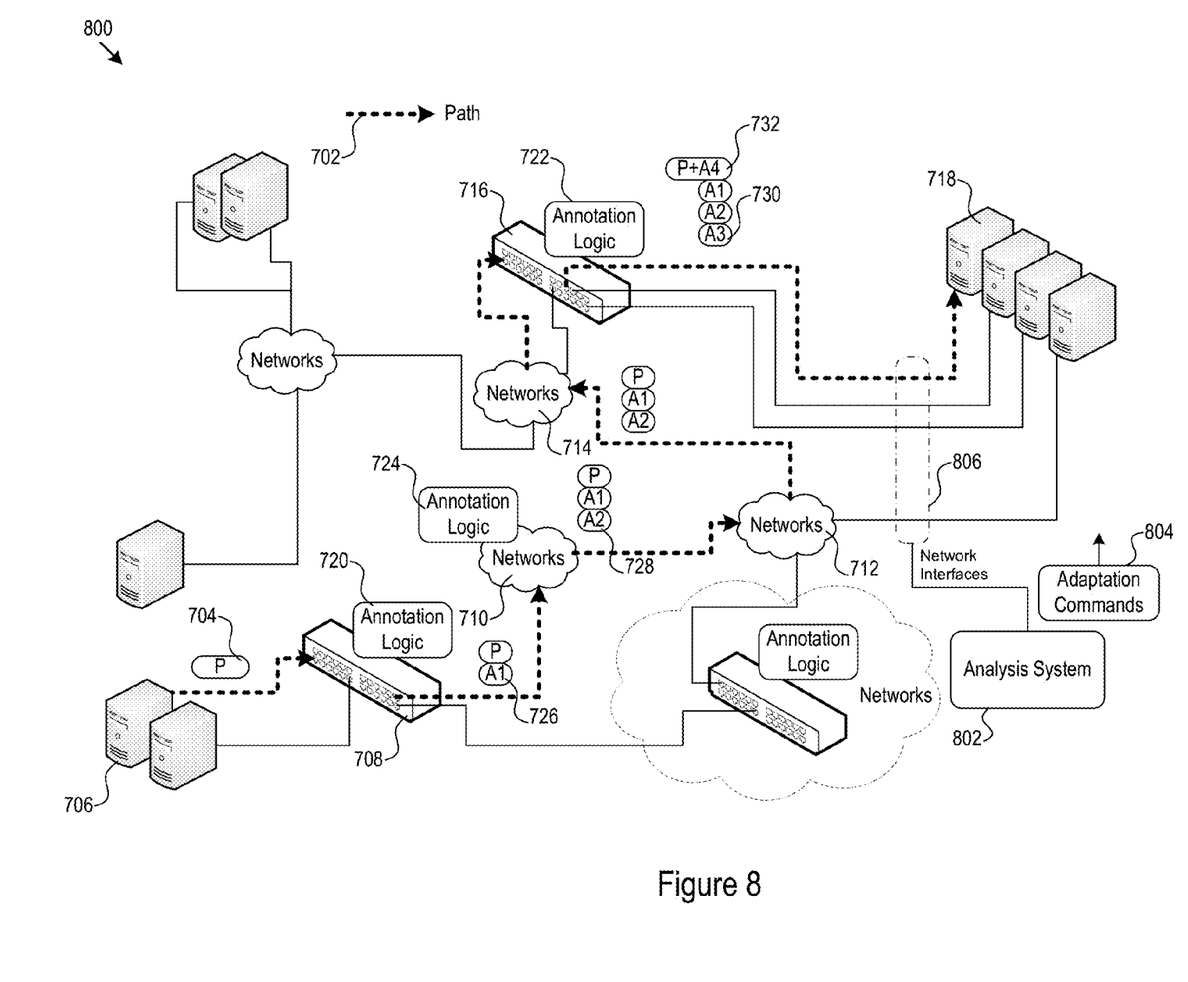
FIG. 8 shows an example communication system in which an analysis system communicates adaptation commands into the network.

FIG. 8 shows an example communication system 800 in which an analysis system 802 communicates adaptation commands 804 into the network. The adaptation commands 804 may be based upon analysis and review of annotation information received in packets communicated through the communication system 800. Any number and type of network interfaces 806 may be present through which the analysis system 802 obtains annotation information, and also through which the analysis system 802 communicates adaptation commands 804 into the network.

Figure 9:
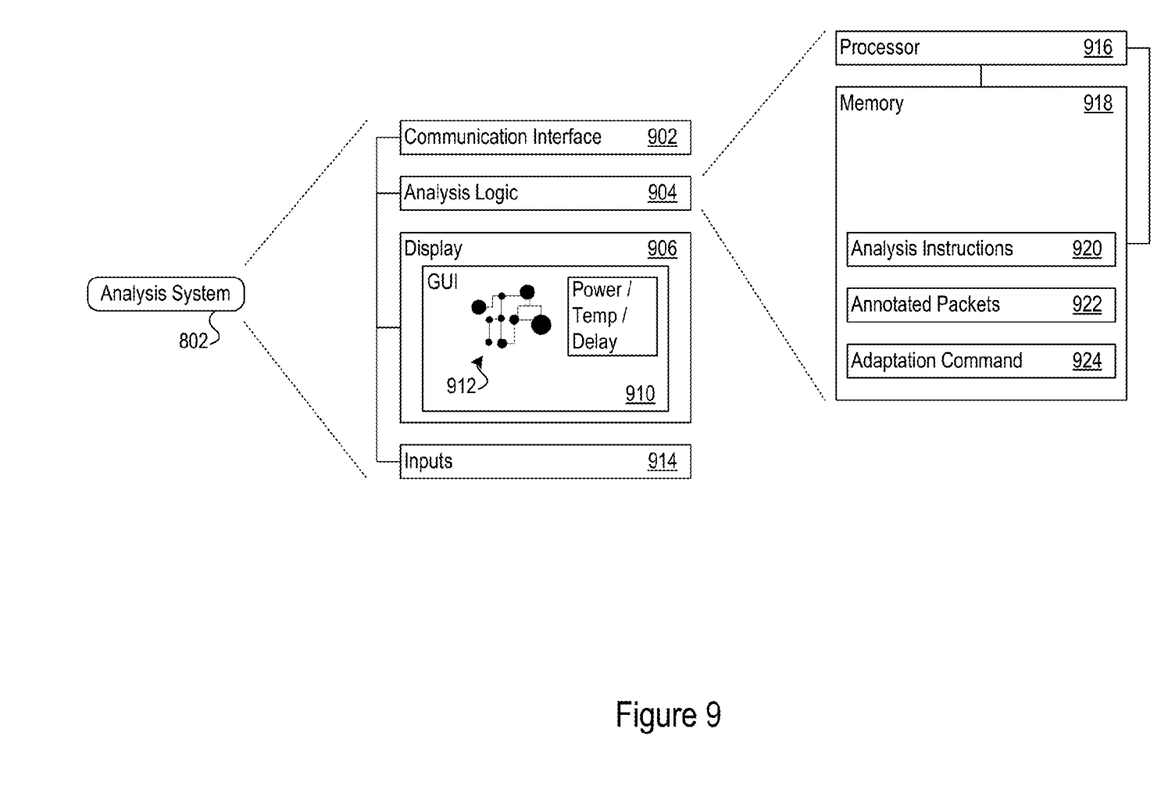
FIG. 9 shows an example analysis system.

FIG. 9 shows an example implementation of an analysis system 802. The analysis system 802 includes a communication interface 902, analysis logic 904, and a user interface 906. The communication interface 902 may include one or more Ethernet ports, or any other type of wired or wireless communication interface. The communication interface 902 receives packets that include annotation information. These packets may be generated by the communication systems described above (e.g., the generated annotated packet 726). The packets may also be packets that were already part of the traffic flow, but to which a network device has added annotation information (e.g., the annotated packet 732).

The user interface 906 may display, for example, a graphical user interface (GUI) 910. The user interface 906 may accept network management parameters, annotation analysis commands, and display through the GUI 910 any type of network management interface 912, such as management dashboards. The network management interface 912 may visualize, as just a few examples, power, temperature, and delay for any network device, set of network devices, either individually or aggregated across or any parts of the communication system. The annotation information in the annotated packets drives the visualization and analysis, which the analysis logic 904 may carry out. The user inputs 914 provide keyboard, mouse, voice recognition, touchscreen, and any other type of input mechanisms for operator interaction with the analysis system 802.

The analysis logic 904 may be implemented in hardware, software, or both. In one implementation, the analysis logic 904 includes one or more processors 916 and memories 918. The memory 918 may store analysis instructions 920 (e.g., program instructions) for execution by the processor 916. The memory 918 may also hold the annotated packets 922 received at the communication interface 902.

As will be described in more detail below, the analysis instructions may generate adaptation commands 924. The analysis system 802 may send the adaptation commands 924 to any network device (not just network devices that provided annotation information). The adaptation commands 924 may, as just a few examples: cause a change in the way that packets are processed in any network device, change the way packets are routed through the network, request further annotation information from the network device, or cause any other adaptation. Some examples are described further below.

Said another way, the memory 918 holds annotated packets 922 received from one or more switching device in a network that connects a source device to a destination device through the switching device. The memory 918 also includes analysis instructions operable to, when executed by the processor 916, recover annotation information from the annotated packets 922. The annotation information may include network device information for one or more network devices in the network that route packets between the source device and the destination device. The annotation information may be information that is otherwise unavailable or otherwise unknown to one or more of the source device, destination device, or analysis system.

The analysis instructions 920 may generate a user interface 910 that, for example, includes a mapping of the annotation information to the network devices in the network. The mapping may represent power, delay, latency, buffer levels, or any other characteristic of the network or network devices. The analysis instructions 920 may also receive an adaptation input from the user interface 910 and in response generate an adaptation command 924. The analysis instructions 920 may communicate the adaptation command 924 to any one or more of the network devices.

The analysis system 802 generates user interfaces that help understand, in detail and at very granular levels, the operation of the communication system through which packets flow. As just a few examples, the analysis system 802 may generate user interfaces that display time series traces of per-device power consumption, buffer fill levels, and switching latency. As another example, the user interfaces may display hop-by-hop delay, in which any network device may be designated as a hop along the packet path from source to destination. The user interfaces facilitate aggressive application tuning as well as aggressive network tuning. As one use case example, an analysis system operator may tune map-reduce jobs that benefit from efficient packet flow through the network, upon analysis of annotation information in the packets.

The analysis system may, either automatically, or under operator control, tune any of the network devices using the annotation information as a feedback mechanism. The tuning may be done in real time, or in response to operator input. The tuning may be dynamic, changing over time to meet desired service levels (e.g., to consistently meet latency requirements specified by customers). Thus, the annotation analysis capabilities provide additional information for existing data centers to debug their infrastructure, and provide deep inside into even individual network device (e.g., switch) performance, in a fine grained manner.

The annotation information, as noted above, may be added to packets on a per destination basis, and also on a per-application basis. Accordingly, the annotation information facilitates rapid diagnosis of network issues, including at the application level. In some scenarios, the annotation information and its analysis may help rule out false positives. For example, at each hop, the analysis system may obtain delay information and buffer fill level information to diagnose which network devices are actually the network devices dropping packets.

Figure 10:
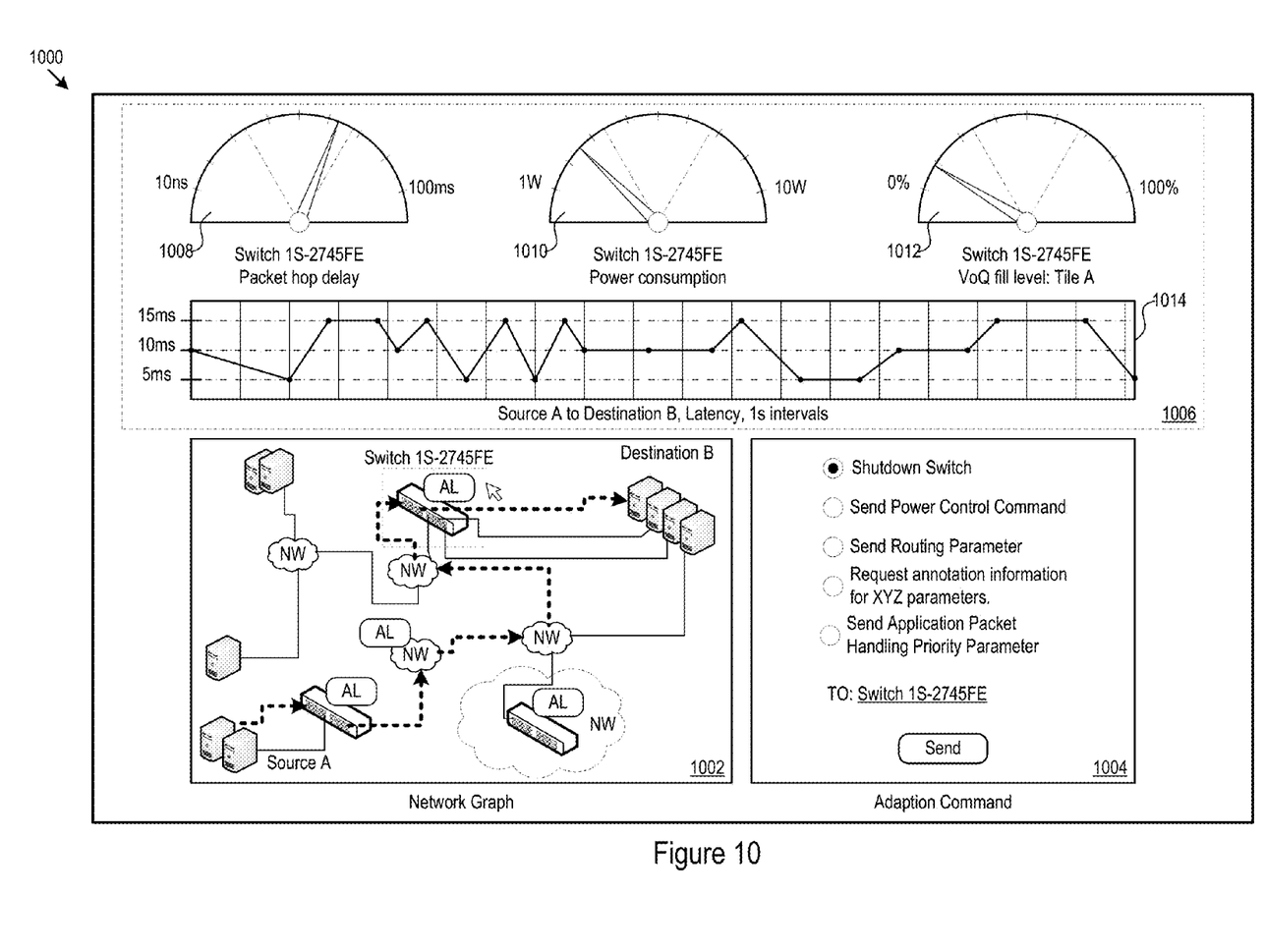
FIG. 10 shows an example adaptation dashboard.

FIG. 10 shows an example adaptation dashboard 1000 ("dashboard 1000"). The analysis system 802 may generate any number or type of such dashboards on the GUI 910, for the review, analysis, and adaptation of any aspect of network performance. The dashboard 1000 includes any desired reporting widgets, graphs, text, or other user interface elements or other representations or views for reporting characteristics of the networks through which packets travel, at any desired level of granularity from the individual network devices, up to the network as a whole. The adaptation information in the annotated packets conveys the information to the analysis system 802 that drives the display, analysis, and adaptation of the network.

In the dashboard 1000, a network graph 1002 shows the network topology (or a selected part of the network topology) and the individual devices in the network topology (or any selected network devices in the network). Adaptation logic is abbreviated "AL", and network is abbreviated "NW". The dashboard 1000 also includes an adaptation command interface 1004, and a reporting interface 1006. The reporting interface 1006, in this example, shows a hop delay gauge 1008, a power consumption gauge 1010, and a queue fill level gauge 1012. In this example, the operator has selected switch ID#1S-2745FE for review from the network graph 1002.

The reporting interface 1006 further includes a latency graph 1014, which, in this example shows the latency between the Source A and the Destination B selected from the network graph 1002. Any of the elements in the reporting interface 1006 may be added, removed, or changed to present any selected view of network characteristics at any level of granularity. As one example, instead of latency between Source A and Destination B, the reporting interface 1006 may show average latency of packets received at port 14 of switch 1S-2745FE to delivery of the packets to the switch fabric of the same switch as the packets are routed to an output port. As long as the annotation information provides that information, virtually any information about the network at any level may be presented for analysis.

The adaptation command interface 1004 provides one example mechanism for the operator to push adaptation commands into the network. In the example shown, the operator has chosen to send a shutdown command to the switch 1S-2745FE. The adaptation command interface 1004 may implement virtually any adaptation command for delivery to virtually any network device. As some examples, the adaptation commands may set operational parameters like maximum power consumption, minimum and maximum buffer levels, preferred or mandatory routing parameters, and packet handling parameters. The adaptation commands may shut down or start up network devices altogether. As additional examples, the adaptation commands may request specific annotation information from a network device, may set annotation schedules, or set annotation criteria.

Figure 11:
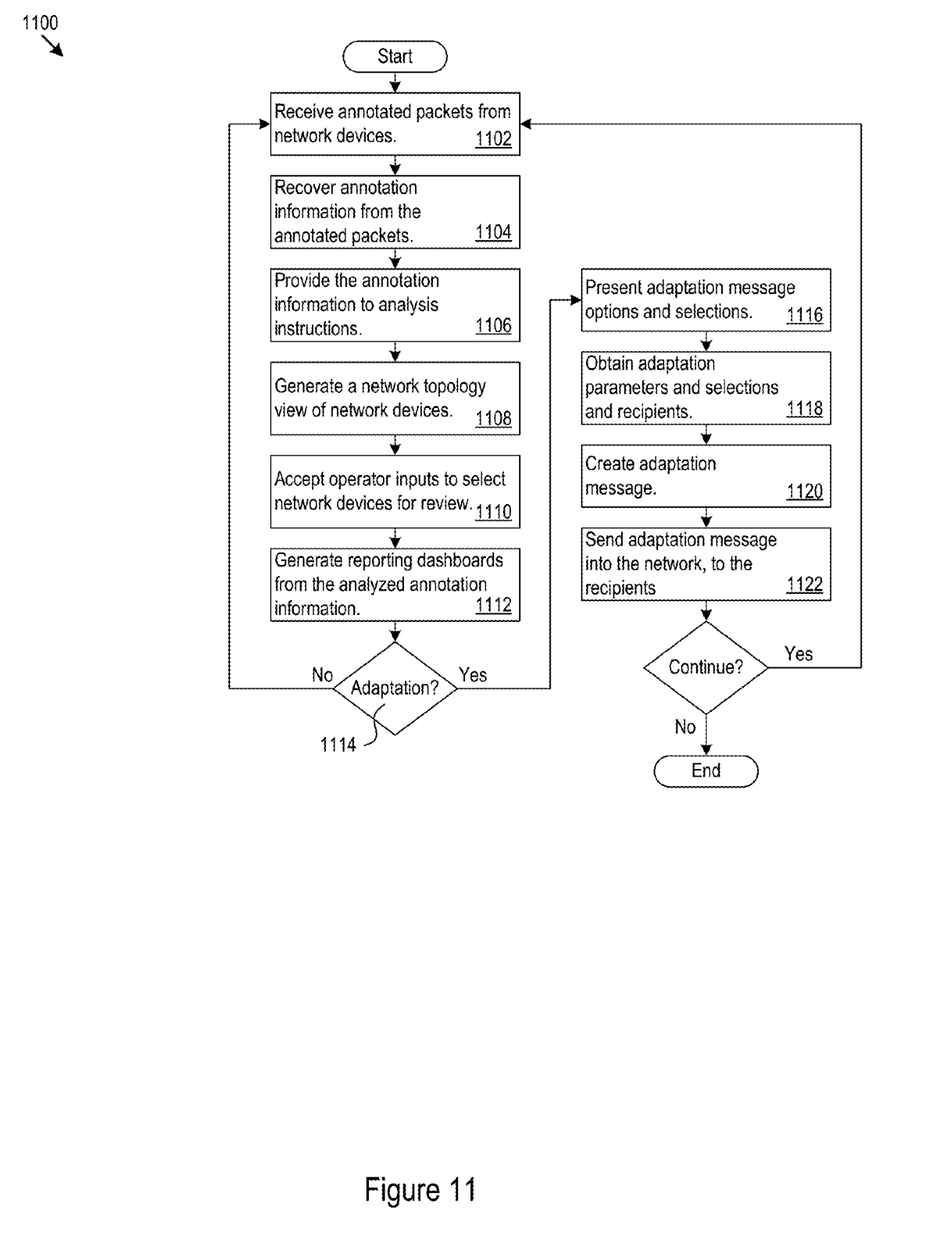
FIG. 11 shows example logic for annotated tracing driven network adaptation.

FIG. 11 shows example logic 1100 for annotated tracing driven network adaptation. The analysis system 802 may, for example, implement the logic 1100 in the analysis instructions 920, for example.

The logic 1100 receives annotated packets from network devices (1102), and recovers the annotation information from the annotated packets (1104). The logic 1100 saves the annotation information in memory (and optionally in profiling databases for historical data capture, for example). The annotation information is thereby provided to the analysis instructions to operate on (1106).

The logic 1100 may generate, for example, a network topology 1002 diagram that displays the various network devices of interest (1108). The logic 1100 may accept operator inputs to select network devices for review (1110). In response to the operator inputs, the logic 1100 may generate reporting dashboards from the annotation information, whether or not processed in any manner by the analysis instructions (1112).

The operator may further specify whether to perform a network adaptation (1114). If so, the logic 1100 may present adaptation message options and parameter selections (1116), and obtain selections from the operator (1118). The logic 1100 then creates an adaptation message (1120). The logic 1100 sends the adaptation message to any specified recipients (1122). The recipient may be a single network device, or may be multiple network devices. The adaptation message may be delivered by unicast, multicast, or broadcast delivery, or in other ways.

In other implementations, the logic 1100 performs automated monitoring and adaptation. For example, service level agreement metrics (e.g., maximum packet hop latency or maximum power consumption) may be present in the analysis system. The logic 1100 may then obtain annotation information, derive performance metrics, and compare the performance metrics to the agreed metrics. When adaptation may help to meet the agreed metrics, the logic 1100 may automatically generate and send adaptation messages to any network devices for the purpose of modifying network behavior toward compliance with the agreed metrics.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability described above may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method comprising:
   receiving packets from a network that connects a source device to a destination device;
   obtaining annotation information from the packets, the annotation information comprising network device information for a network device in the network;

generating an analysis interface comprising a view of the annotation information, the analysis interface comprising a network topology diagram comprising operator selectable network devices between the source device and the destination device;
determining that an operator selection of the network device from the network topology diagram occurred;
selecting specific annotation information from among the annotation information from the packets that is specific to the network device;
displaying in the analysis interface a representation of the specific annotation information;
receiving an adaptation command from the analysis interface; and
communicating the adaptation command to the network device in response to the operator selection.

2. The method of claim 1, where:
the network device information comprises internal switching characteristics of a network switch through which the packets have passed.

3. The method of claim 1, where:
the representation comprises a graphical presentation of the selected annotation information.

4. The method of claim 1, further comprising:
presenting adaptation parameters applicable to the network device; and
obtaining an operator selection among the adaptation parameters.

5. The method of claim 4, further comprising:
creating an adaptation message in response to the operator selection; and
sending the adaptation message to the network device.

6. The method of claim 5, where:
the operator selection comprises a network switch performance parameter selection.

7. The method of claim 1, further comprising:
sending an annotation information request message to the network device.

8. The method of claim 1, where:
the network device information comprises internal switching characteristics of a network switch through which the packets have passed, and that are unavailable to an application server that processes the packets.

9. The method of claim 1, where the network device is configured to append the annotation information to the packets in accord with an annotation schedule stored at the network device, the annotation schedule characterized by a defined interval for periodic annotation by the network device; and
where the adaptation command comprises an update to the annotation schedule.

10. The method of claim 9, where the interval comprises a number of packets, a number of units of time, or both.

11. A device comprising:
a packet buffer operable to receive a packet from a source application server;
a display; and
analysis circuitry in communication with the packet buffer, the analysis circuitry operable to:
    obtain annotation information from the packet, the annotation information comprising network device information about a network device in a network that routes the packet to a destination device, the network device configured to append the annotation information to the packet responsive to an annotation criteria, the annotation criteria comprising a power consumption threshold;
    generate a view on the display of the annotation information with respect to the network device;
    receive an adaptation input, the adaptation input comprising an update power consumption threshold; and
    communicate a network adaptation to at least one of the network devices in response to the adaptation input.

12. The device of claim 11, where:
the view comprises a network performance analysis dashboard.

13. The device of claim 11, where:
the view comprises a device characteristic of the network device.

14. The device of claim 13, where:
the device characteristic comprises an environmental characteristic of the network device.

15. The device of claim 13, where:
the device characteristic comprises a performance characteristic of the network device.

16. The device of claim 13, where:
the analysis circuitry is further operable to:
    generate an adaptation command interface; and
    receive the adaptation input through the adaptation command interface.

17. A system comprising:
a processor; and
a memory in communication with the processor, the memory comprising:
    annotated packets received from a switching device in a network that connects a source device to a destination device through the switching device;
    analysis logic operable to, when executed by the processor:
        recover annotation information from the annotated packets, the annotation information comprising network device information for network devices in the network that route packets between the source device and the destination device; and
        generate a user interface comprising a view of the annotation information with respect to the network devices in the network;
        receive an adaptation input from the user interface, the adaptation input comprising a request for additional annotation information from an individual one of the network devices; and
        communicate a network adaptation to the individual one of the network devices in response to the adaptation input.

18. The system of claim 17, where:
the annotation information comprises environmental information.

19. The system of claim 17, where:
the annotation information comprises switching performance information.

20. The system of claim 17, where:
the annotation information comprising network device information that is unknown to the source device and the destination device.

* * * * *